UNITED STATES PATENT OFFICE.

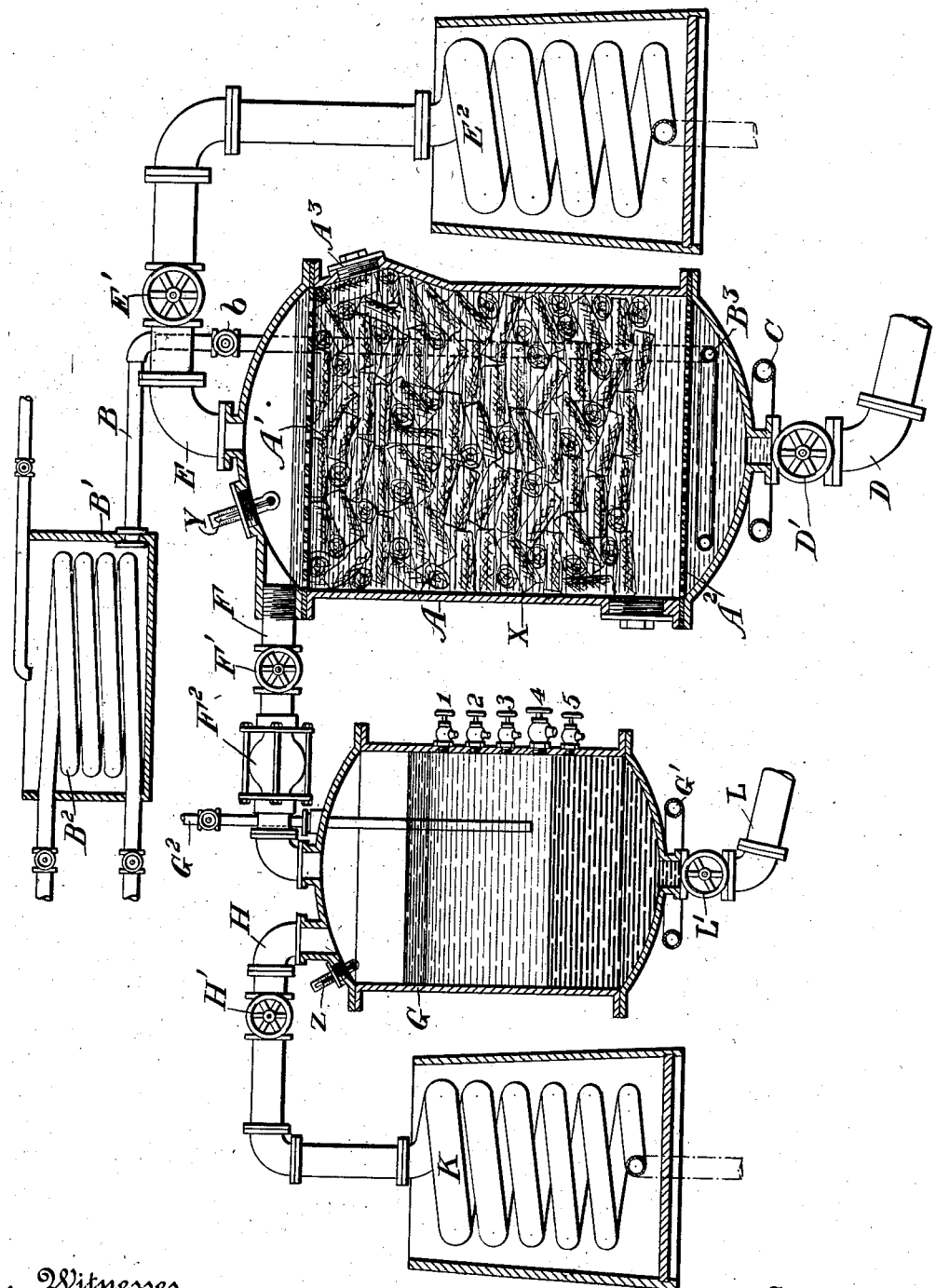

WILL K. HALE, OF CATSKILL, NEW YORK, AND CURTISS W. KÜRSTEINER, OF ENGLEWOOD, NEW JERSEY.

PROCESS OF OBTAINING TURPENTINE, ROSIN, &c., FROM WOOD.

No. 828,474.  Specification of Letters Patent.  Patented Aug. 14, 1906.

Application filed May 29, 1902. Serial No. 109,510.

*To all whom it may concern:*

Be it known that we, WILL K. HALE, residing at Catskill, county of Greene, State of New York, and CURTISS W. KÜRSTEINER, residing at Englewood, county of Bergen, State of New Jersey, citizens of the United States, have jointly invented a Process of Obtaining Turpentine, Rosin, and other Constituents from Wood, of which the following is a specification.

Heretofore it has been proposed to subject wood, such as yellow pine, containing terebinthinate or turpentine-bearing gum to the action of water maintained at the boiling-point and also at a higher temperature than 212° by adding to the water some material to increase its density and raise the point at which it boils. In such a process some of the gum or terebinthinate will rise to the surface and may be removed for further treatment; but owing to the maintenance of the temperature at or above that of the boiling-point of water turpentine will be driven off from a comparatively large percentage of the gum and will be wasted and that portion of the gum being deprived of its lighter constituents will remain among the pieces of wood and be practically lost, and when the wood is subsequently subjected to destructive distillation the products from the gum mingle with the distillation products of the wood, which must therefore be subjected to special treatment to eliminate them.

This invention is based upon the discovery that when the wood is subjected to the action of a bath of water maintained at a temperature just below the boiling-point or approximately just below 212° Fahrenheit the terebinthinate or gum will separate from the wood and retaining its turpentine or its volatile or more buoyant constituents will rise to the surface of the bath, whence it may be removed or caused to flow over to a suitable still, in which it may be subjected to a distilling operation for separation into its constituent parts, turpentine, rosin-oil, and rosin. The wood from which the terebinthinate has been so removed may be subjected to destructive distillation in the ordinary way and for the ordinary purposes. By so treating the wood by a bath of water maintained at a temperature just below that of the boiling-point substantially all of the terebinthinate may be eliminated, and hence the products from a destructive distillation of the wood are free from the products of the distillation of the terebinthinate, which if present will constitute a foreign element or impurity.

The accompanying drawing depicts somewhat diagrammatically an apparatus for practicing this invention. Our process is not limited, however, to the use of any particular apparatus. That illustrated has been practically tested and serves to carry out the process hereinbefore briefly described.

A is a vertical cylindrical vessel having convex or dome-shaped ends. Near the upper and lower ends, respectively, are gratings $A'$ $A^2$, the openings in the upper one of which are of considerable dimensions. The wood to be treated by the hot-water bath may be introduced into the space between the gratings through a lateral charging-orifice $A^3$ and should be in sufficiently small pieces. Of course it may be in the form of chips or shavings; but we have found by experience that it is quite sufficient to cut it to the size of ordinary kindling-wood. The water may be introduced by a vertical pipe B, having a cock $b$, which extends from a tank $B'$, containing a heating-coil $B^2$, and is connected at its lower end with a perforated annular pipe $B^3$, located within the chamber A below the lower grating $A^2$.

Beneath the vessel A is placed an annular gas or other vapor burner C, and from the bottom of the vessel passes a pipe D, having a cock $D'$. From the top of the vessel leads a pipe E, having a cock $E'$, which connects with a condensing-worm $E^2$. Since the vessel A serves for the destructive distillation of the wood after the terebinthinate has been separated therefrom, it will be called the "retort." The wood (indicated by X) preferably substantially fills the space between the gratings, and the water-level during the operation should be above the upper grating $A'$. Just at the operating water-level there is a lateral pipe F, having a cock $F'$, and in the length of which is interposed an observation-bulb $F^2$, of glass, beyond which the pipe opens into the top of a still G.

The retort A having been charged with wood, preferably rich long-leaf yellow pine, and water admitted which is preferably warm and which preferably has a temperature of 130° or thereabout, the temperature of the bath is raised by the flame of the burner C to something less than the boiling-point, or 212°. Our practice shows that a temperature of 210° or 211° is most effective, at which temperature the bath is maintained. The retort A would in practice be inclosed by a suitable shell to conserve the heat energy and apply the rising products of combustion of the flame to the sides of the retort. In this way the temperature may be maintained at the desired point. A thermometer Y may be introduced through an aperture in the top of the retort to guide the operator in his regulation of the burner. Under the action of the hot water the terebinthinate will exude from the wood somewhat in the form of globules and without giving off its turpentine will rise to the top of the bath, and the bulk of the bath being increased—as, for instance, by addition of water gradually or from time to time in small quantities through the pipe B—the gum may be floated off through the pipe F into the still G. This operation continues until substantially all of the gum has left the wood and been transferred to the still. During the operation the valve E' has been closed. It may now be opened, the valve F' closed, and the water from the retort be drawn off by the pipe D. The heating of the retort may now be continued at a higher temperature to effect the destructive distillation of the wood therein for the production of products—such as charcoal, pyroligneous acid, creosote, tar-oils, and tar—and since the terebinthinate has been eliminated from the wood these constituents may be separated in the usual way and are pure products in that they do not contain the products of distillation of the terebinthinate.

The contents of the still G will stratify therein, the bulk of the gum or terebinthinate sinking to the bottom, being more dense on account of the lower temperature, the still not being heated, while a smaller quantity of lighter gum having the same general characteristics as the other portions of gum will float upon the water within the still.

1, 2, 3, 4, and 5 represent a series of cocks placed at different levels on the side of the still. Through these samples may be tapped off to indicate the stratification and the level of the contents of the still. The cock 4 is preferably of somewhat larger dimensions than the others and may be used to draw off excess of water during the run of the retort A, hereinbefore described. The valve F' being closed, heat is applied to the still G by means of an annular gas or other vapor burner G' and the temperature of the contents raised to about 215° Fahrenheit, at which the lighter gum, water, and heavier gum form a boiling emulsion; the vapors from which pass through a pipe H, having a cock H', to a condensing-worm K. This portion of the process is continued until all the vapor is carried over, the period depending upon the quantity of gum treated. Water may be added, if required, through the pipe G². The condensed product of the distilling operation will be water, and floating upon the water pure sparkling turpentine answering all tests for purity, strength, chemical reaction and medicinal properties, and entirely free from foreign or obnoxious odors. The temperature of the still may now be raised to drive off the rosin-oil, which will be condensed and collected. The turpentine and water having been eliminated from the still, the residuum will be rosin of fine quality, which while yet heated and liquid may be drawn off through the pipe L, having a cock L'.

During the operation of the still G the temperature may be indicated by a thermometer Z, provided with a bushing closely fitting an aperture in the top of the still. During the destructive distillation of the wood in the retort A the thermometer Y may be removed and the aperture in the top of the retort closed by a screw-plug. The upper grating A' serves to hold back the wood, which would be floated upwardly, and the openings therein are made of ample dimensions to permit the gum to pass freely, while preventing chips or pieces of wood from rising to the surface and being floated over to the still G.

Without intending to limit the invention in its broader aspect, we may say that experience has shown that highly satisfactory and substantially perfect results are obtained by introducing the water into the retort A at a temperature of about 130° Fahrenheit and gradually raising its temperature until the limit of about 210° or 211° has been reached, or, in other words, until a temperature just short of the boiling-point is attained and at which the bath is maintained. It appears also that the local application of heat at the bottom of the retort A induces upward currents in the bath which tends to assist the terebinthinate in rising to the surface.

By the use of this process we have obtained from the treatment of one hundred and twenty-eight pounds of rich long-leaf straw pine-wood during a period of from three to five hours one gallon of turpentine of high grade and about twenty-five pounds of rosin of fine quality.

The boiling of the water-bath is to be avoided because of the retention in the collection of pieces of wood of a considerable percentage of terebinthinate. The maintenance of the temperature of the bath just below the boiling-point, or, in other words, at a temperature of approximately 210° or 211° Fahrenheit, is desirable, because at that temperature there is an active elimination of the terebinthinate or turpentine-bearing gum from the wood. It should be understood, however, that at somewhat lower temperatures than 210° or 211° there will be a separation of the terebinthinate from the wood; but it is not so active, and hence the period of operation must be prolonged, and in our opinion the terebinthinate is not so completely extracted from the wood as is the case where a temperature just below the boiling-point, or, in other words, 210° or 211° is employed.

We claim as our invention—

1. The process of separating terebinthinate from wood which consists in subjecting the wood to the action of a bath of hot water maintained at a temperature below the boiling-point but sufficiently high to extract the terebinthinate from the wood.

2. The process of separating terebinthinate from wood which consists in subjecting the wood to a bath of hot water maintained at a temperature just below the boiling-point.

3. The process of separating terebinthinate from wood which consists in subjecting the wood to a bath of hot water maintained at a temperature below the boiling-point and increasing the bulk of the bath to thereby flow or float the terebinthinate, which has arisen to the surface, from the vessel in which the operation is conducted.

4. The process of obtaining turpentine from wood by a continuous operation conducted in one apparatus which consists in subjecting the wood to a bath of hot water maintained at a temperature below the boiling-point, but sufficiently high to extract the terebinthinate from the wood, automatically removing the extracted terebinthinate from the surface of the bath to a suitable still and then distilling it for the separation of the turpentine.

5. The process of obtaining turpentine, rosin-oil and rosin from wood by a continuous operation conducted in one apparatus, which consists in subjecting the wood to a bath of hot water maintained at a temperature below the boiling-point but sufficiently high to extract the terebinthinate therefrom, automatically removing the terebinthinate from the surface of the bath, distilling it for the separation of the turpentine and finally further distilling it at a higher temperature for the separation of the rosin-oil from the rosin.

6. The process of obtaining from wood, turpentine, rosin and the products of destructive distillation of the wood by a continuous operation conducted in one apparatus which consists in subjecting the wood to a bath of hot water maintained at a temperature below the boiling-point but sufficiently high to separate the terebinthinate from the wood, automatically removing the terebinthinate from the surface of the bath to which it rises, then distilling it for the separation of the turpentine from the rosin, removing the water-bath from the wood and subjecting the wood to destructive distillation.

7. The process of obtaining turpentine and rosin from wood which consists in subjecting the wood to a bath of hot water maintained at a temperature just below the boiling-point to separate the terebinthinate from the wood, adding water to the bath to float or flow the terebinthinate from the surface thereof, subjecting the water and terebinthinate so removed from the surface of the bath to a distilling temperature to separate the water and turpentine from the rosin.

8. The process of obtaining turpentine and rosin from wood which consists in subjecting the wood to a bath of hot water maintained at a temperature just below the boiling-point to separate the terebinthinate from the wood, adding water to the bath to float or flow the terebinthinate from the surface thereof, subjecting the water and terebinthinate so removed from the surface of the bath to a distilling temperature to separate the water and turpentine from the rosin and finally distilling the rosin at a higher temperature to separate the rosin-oil therefrom.

9. The process of obtaining turpentine from wood which consists in subjecting the wood to a bath of water having an initial temperature of about 130° Fahrenheit and slowly raising the temperature and maintaining it at about 210° or 211° Fahrenheit to separate the terebinthinate which rises to the surface of the bath, floating or flowing the terebinthinate from the surface of the bath to a still, heating the contents of the still to a temperature of about 215° Fahrenheit and condensing the resulting vapors.

10. The process of obtaining turpentine from wood which consists in subjecting the wood to a bath of water having an initial temperature of about 130° Fahrenheit, slowly raising the temperature to and maintaining it at about 210° or 211° Fahrenheit to separate the terebinthinate which rises to the surface of the bath, adding water to the bath gradually or from time to time to flow or float the terebinthinate from the surface thereof to a still, raising the temperature of the contents of the still to about 215° Fahrenheit, condensing the resulting vapors and removing the residuum from the still.

11. The method of obtaining turpentine, rosin and rosin-oil from wood which consists in subjecting the wood to a bath of water having an initial temperature of about 130° Fahrenheit, slowly raising the temperature to and maintaining it at about 210° or 211° Fahrenheit to separate the terebinthinate which rises to the surface of the bath, adding water to the bath gradually or from time to time to float or flow the terebinthinate into a still, raising the temperature of the contents of the still to about 215° Fahrenheit, condensing the resulting vapors, then raising the temperature of the residual contents of the still to vaporize the rosin-oil, condensing said vapor and finally removing the residual rosin from the still.

In testimony whereof we have hereunto subscribed our names.

WILL K. HALE.
CURTISS W. KÜRSTEINER.

Witnesses as to Will K. Hale:
W. H. HOLT,
W. C. SMITH.

Witnesses as to Curtiss W. Kürsteiner:
KATHARINE MacMAHON,
LILLIE L. BROWNING.